United States Patent [19]

Grantham

[11] 4,227,977
[45] Oct. 14, 1980

[54] HYDROGEN GAS GENERATION UTILIZING A BROMIDE ELECTROLYTE, A BORON PHOSPHIDE SEMICONDUCTOR AND RADIANT ENERGY

[75] Inventor: Daniel H. Grantham, Glastonbury, Conn.

[73] Assignee: United Technologies Corporation, Hartford, Conn.

[21] Appl. No.: 65,824

[22] Filed: Aug. 13, 1979

Related U.S. Application Data

[63] Continuation-in-part of Ser. No. 956,760, Nov. 1, 1978.

[51] Int. Cl.³ .................................................. C25B 1/02
[52] U.S. Cl. ............................. 204/129; 204/DIG. 3; 429/111
[58] Field of Search .................... 204/129, DIG. 3; 429/111

[56] References Cited

U.S. PATENT DOCUMENTS 4,144,147  3/1979  Jarrett et al. ......................... 204/129

OTHER PUBLICATIONS

S. N. Paleocrassas, "Photocatalytic Hydrogen Production: A Solar Energy Conversion Alternative?", *Solar Energy*, vol. 16, pp. 45-51, (1974).

W. A. Gerrard et al., "Solar Energy Conversion Using Semiconducting Photoanodes", *J. Vac. Sci. Technol.*, vol. 15, pp. 1155-1165, (1978).

H. Gerischer, "Solar Photoelectrolysis with Semiconductor Electrodes", Chap. 4 in *Topics in Applied Physics*, vol. 31, Solar Energy Conversion-Solid-State Physics Aspects, Edited by B. O. Seraphin, Springer-Verlag, (1979), pp. 115-172.

M. Tomkiewicz et al., "Photoelectrolysis of Water with Semiconductors", *Appl. Phys.*, vol. 18, pp. 1-28, (1979).

M. Rajeshwan et al., "Energy Conversion In Photo-electrochemical Systems—A Review", *Electrochimica Acta*, vol. 23, pp. 1117-1144, (1978).

A. J. Nozik, "Electrode Materials for Photoelectrochemical Devices", *J. Crystal Growth*, vol. 39, pp. 200-209, (1977).

*Primary Examiner*—Aaron Weisstuch
*Attorney, Agent, or Firm*—Harry J. Gwinnell

[57] ABSTRACT

Radiant energy in conjunction with a boron phosphide semiconducting electrode to at least partially power an electrolytic cell is used in the generation of hydrogen, utilizing a bromide, preferably hydrogen bromide, as the essential electrolyte component in the electrolytic cell to solve overvoltage and corrosion problems associated with the use of conventional electrolytes in similar environments. The use of the bromide electrolyte results in the broadening of the selection of semiconductor electrodes which can be used in the process and apparatus of the present invention enabling the boron phosphide semiconducting electrode to be used with superior anticorrosive and radiant energy gathering results over conventional systems. The boron phosphide semiconductors employed can be either boron phosphide alone or multilayered structures with other semiconducting material. The hydrogen generated from such systems can be used to power a fuel cell.

13 Claims, 4 Drawing Figures

U.S. Patent     Oct. 14, 1980     4,227,977
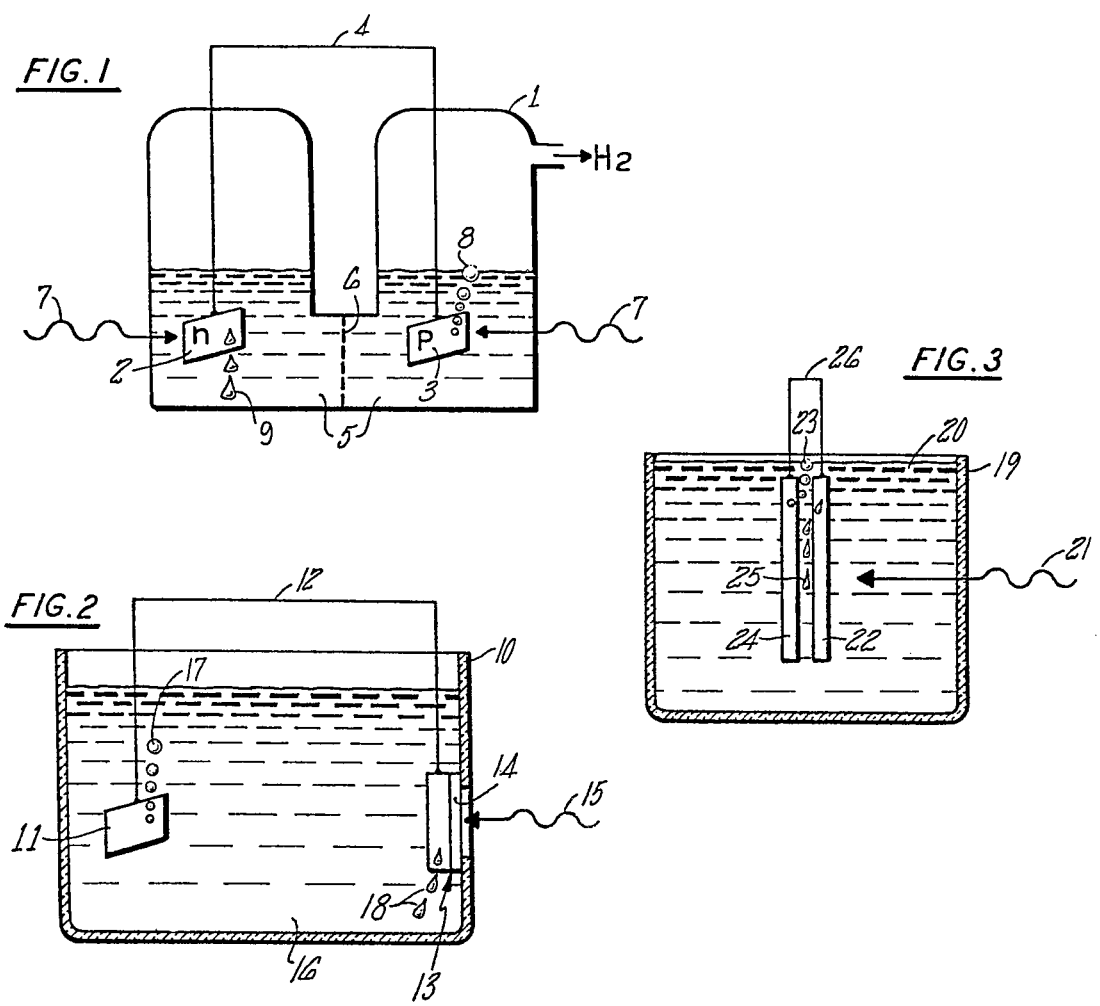
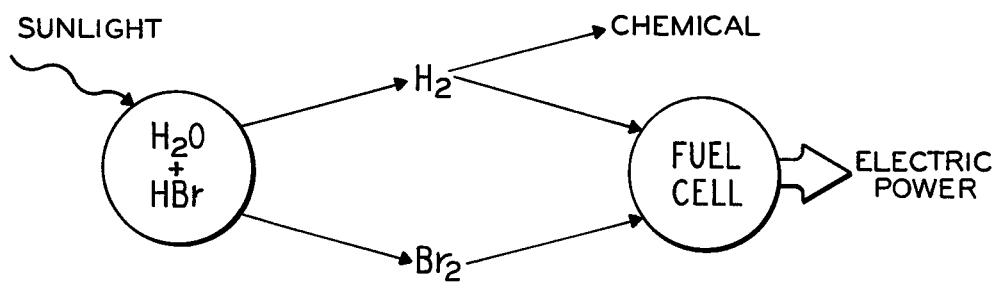
FIG. 4

HYDROGEN GAS GENERATION UTILIZING A BROMIDE ELECTROLYTE, A BORON PHOSPHIDE SEMICONDUCTOR AND RADIANT ENERGY

This application is a continuation-in-part of copending U.S. application Ser. No. 956,760, filed Nov. 1, 1978.

CROSS REFERENCE TO RELATED APPLICATIONS

Reference is made to U.S. patent application Ser. No. 956,761 filed by the same inventor Nov. 1, 1978, having the same assignee, which demonstrates a method useful for generating hydrogen bromide which can be used as an electrolyte in the present invention.

BACKGROUND OF THE INVENTION

1. Field of the Invention

The field of art to which this invention pertains is electrolytic processes for producing hydrogen gas.

2. Description of the Prior Art

The use of solar energy to power electrolytic cells has received widespread attention in view of recent energy resource depletion and environmental pollution awareness. The production of hydrogen from electrolytic cells and the use of solar energy to power such cells has been recognized by the prior art as a marriage of two arts which has great potential in the solution of both these problems. While much work has been done on improving the efficiency of such systems, more work is needed in view of the low energy levels involved in extracting useful energy from the sun (i.e., low extractable voltages from sunlight per square foot of collection apparatus) and in view of the overvoltage and corrosion problems associated with the use of conventional electrolytes in this environment. The range of semiconductor material useful to gather this potentially great source of energy in this environment has also been limited because of the corrosive effects of conventional electrolytes on such semiconductors. For example, in an article by Frank and Bard (*Journal of the American Chemical Society*, Volume 99, July 1977, pgs. 4667–4675) the problem of corrosion of the electrode surfaces in photo-assisted electrolysis systems is described.

What is needed is an electrolyte system useful in basically conventional electrolytic cells which are at least partially radiant energy powered and which will produce hydrogen to power a fuel cell while solving the inefficient overpotential and corrosion problems associated with the use of conventional electrolyte systems. What is also needed is a system which will expand the use of available semiconductor material which can be used in such systems to provide more flexibility in establishing photoelectric processes with greater efficiency.

BRIEF SUMMARY OF THE INVENTION

In accordance with the present invention, electrolytic processes for producing hydrogen gas useful to power a fuel cell have been invented which utilize bromides, and especially hydrogen bromide as the essential electrolyte, in conjunction with at least one boron phosphide semiconducting electrode, thereby solving the overpotential and corrosion problems associated with the use of conventional electrolytes in this environment in maximizing the efficiency of such photoelectrolytic processes.

The foregoing and other objects, features and advantages of the present invention will become more apparent in light of the following detailed description of preferred embodiments thereof as discussed and illustrated in the accompanying drawings.

BRIEF DESCRIPTION OF THE DRAWINGS

FIG. 1 describes a typical cell arrangement utilizing a standard photoelectrolytic cell.

FIG. 2 describes a second arrangement where the radiant energy source activates from the dry side of the cell.

FIG. 3 describes another arrangement where the radiant energy source activates from the solution side of the cell.

FIG. 4 describes schematically the storage potential of the system of the present invention.

DESCRIPTION OF PREFERRED EMBODIMENTS

As described above, much work has been done in combining solar energy with that body of electrolysis art which produces hydrogen for running, for example, a fuel cell, the marriage of the two arts providing a great source of electrical energy with limitless potential. However, such combination has been difficult because of the small amounts of energy which can be extracted from the sun without cumbersome equipment and the corrosion, overpotential, and other problems associated with the use of conventional electrolytes. The use of bromide compounds, and especially hydrogen bromide, as electrolytes in such a cell environment provides surprising advantages. The lower potentials at which a hydrogen bromide cell can be run, for example, compared to the higher cell potentials necessary for the dissociation of water or chloride compounds, both increases the life of the components of the cell and makes available a broader range of semiconductor material than is presently usable in such cells. Furthermore, the dissociation products from other halogen electrolytes such as hydrogen iodide or hydrogen fluoride, exist as solids or much more corrosive gases under normal conditions of atmosphere and pressure. This presents a myriad of problems of precipitation and special handling in both the electrolytic cell and the fuel cell. And a hydrogen bromide electrolyte provides more energy storage per pound than, for example, hydrogen iodide in an electrolytic cell environment.

While the present invention has been described in terms of producing hydrogen for use in a fuel cell, the bromine produced also has fuel cell utility. Note in this regard, an article by Glass et al, "Performance of Hydrogen-Bromine Fuel Cells", *Advances in Chemistry Series*, Vol. 47, 1964, A.C.S. Applied Publications, which describes the various advantages of such a system.

The bromide cell of the present invention can also be run at reduced pressures and concentrations such that the photoelectrolytic cell can be used with voltages equivalent to the use of such things as hydrogen iodide but with the advantages of dealing with the liquid bromine produced, thus eliminating the problems associated with a product which exists as a solid such as iodine under normal solution conditions. Also, the large optical absorption coefficients of even dilute solutions of other halogen dissociation products such as iodine would have a severely adverse effect on the efficiency of a system which utilizes radiant energy such as light as a power source as in the disclosed invention.

Another advantage of the bromide electrolyte system is that conventional electrolytic cells for the dissociation of water can be readily adapted to a bromide electrolyte system with little or no modification. Chloride or fluoride electrolyte systems, for example, which are more corrosive than even conventional water dissociation systems and solid iodine dissociation products would all clearly require greater modification. There are also very definite advantages of the bromide system in the elimination of the overvoltages associated with chloride and especially water dissociation products. Note the Glass et al article mentioned supra at page 204 and U.S. Pat. No. 4,021,323 at column 7.

While solar energy is the preferred source of radiation in the process and apparatus of the invention, other radiant energy sources can be used such as laser radiation or light emitting solid state diodes, the only requirement being that the radiant energy be of proper wavelength and sufficient intensity to evolve hydrogen gas in the particular cell being irradiated. The proper wavelength required relates to the particular semiconductor being used. The wavelength must be short enough to at least match the characteristic band gap wavelength of the particular semiconductor used. The semiconductor will not absorb radiant wavelengths longer than its band gap radiation characteristic. In fact, one of the advantages of the invention is the elimination of the corrosion and oxidation problems of conventional electrolytes which attack many semiconductor materials, thus enabling a broader range of semiconductor material to be used. With a broader range of semiconducting material thus available, a broader range of light wavelength can be used to more efficiently power the system. Also, while it is preferred to run the electrolysis solely powered by radiant energy, such as light, great advantage can be obtained by combining the light powered system with an external power source such as a battery. This is of particular value in instances where the semiconductor-radiation combination produces insufficient photovoltage to meet the threshold voltage required to run the cell. Note the Nernst equation, infra. For example, for a 48% solution of HBr, 0.6 volt would be required to run the cell, thus any semiconductor-radiation combination producing less than that voltage with such solution would require an external power source. Even with sufficient voltage supplied by the radiation source the external power source could also be used to increase the rate of hydrogen gas evolution, although at a cost in efficiency of the system. In any case, the amount of voltage supplied from this external power source must be less than that required to electrolyze the bromide compound in the absence of the light irradiated semiconductor electrode in order to have an energy efficient system. In such a situation, the power recovered from the recombination of, for example, hydrogen and bromine in a fuel cell would be approximately equal to the sum of the solar input power and external voltage supplied.

As stated above, with the system of the present invention a broader range of semiconductor material is available for solar collection because of the solving of overvoltage and corrosion problems associated with other conventional electrolytes in similar systems, and in the particular embodiment of this invention the use of boron phosphide has been found to produce several advantages. First of all, in many conventional systems because of the corrosion problems associated with environments similar to that of the present invention (note the Frank and Bard article supra) boron phosphide would not be available as a viable solar collection source. However, with the system of the present invention such is not the case. And boron phosphide has advantages over, for example, silicon in that it has a higher photovoltage, lessening the need for and amount of external voltage necessary to run the cells of the present invention. It also has advantages over conventional titanium dioxide semiconductors which can only collect radiant energy at wavelengths below about 4,000 angstroms in that the BP can collect radiant energy at wavelengths up to about 6,200 angstroms. In the bromide system of the present invention the BP also has a corrosion resistance at least comparable to $TiO_2$ and about the same as Si.

While commercial BP may be used in the process, in the preferred embodiment of the invention the BP was formed by a conventional pyrolysis method, e.g., reacting diborane and phosphine in a standard cold wall reactor with Rf susceptor substrate heaters. It is essential to the present invention that at least one boron phosphide semiconductor be used as the photoanode, but optionally the BP can be used as the photocathode as well. As the photoanode an n-type BP is preferably employed doped with suitable n-type dopants such as silicon.

The BP semiconductors can be formed on conventional forming substrates by vapor deposition, cathode sputtering, etc. (including epitaxially grown). The boron phosphide can also be produced and used in the single crystal state, in the polycrystalline state, or in the amorphous state. In a preferred embodiment the BP layer is formed, followed by, for example, vapor depositing an ohmic contact such as aluminum or gold onto the formed BP. Alternatively, after formation of the BP layer, a semiconducting layer such as gallium arsenide or silicon can be vapor deposited, cathode sputtered, etc., onto the preformed BP followed by the deposition and formation of the ohmic contact. The formation steps are conventional and within the purview of one skilled in this art.

As stated above according to the present invention at least the photoanode comprises boron phosphide. The photocathode can also comprise a p-type boron phosphide material similar to the n-type boron phosphide of the anode or the cathode can be a conventional metal electrode such as platinum or titanium. If the p-type boron phosphide is used it can be commercially purchased or formed in the same manner as the n-type boron phosphide described above, the p-type doping produced by the by-product reactants in the BP formation or any other conventional p-type doping. In the present invention, Hall effect measurements were used to classify the BP material as either n-type or p-type doped.

The Nernst equation which governs the cell potential relationship required for electrolysis in this process can be described as follows:

$$E = E° + 0.059 \log P_{H_2} + 0.059 \log C_{Br_2} - 0.059 \log C_{HBr}$$

wherein
E° = standard cell potential for cell components (e.g. for HBr electrolysis 1.06 volt), $P_{H2}$ = partial pressure of hydrogen produced in the cell,
$C_{Br2}$ = molar concentration of bromine liquid produced in the cell,
$C_{HBr}$ = molar concentration of hydrogen bromide or other bromide in the cell,
E = the threshold voltage or cell potential to be overcome by the photovoltage. This is the voltage at which current begins to flow in the cell and significant amounts of hydrogen and bromine begin to evolve.

The preferred parameters for efficient operation of the cell of the present invention are:

$P_{H2}$ = 0.05 psi
$C_{BR2}$ = 0.1%
$C_{HBr}$ = 48%.

A cell with such parameters can be efficiently run at temperatures between about 0° and 100° C. Percents as recited throughout the disclosure are percents by weight.

The particular bromide electrolyte system of the invention and the advantages inherent in its use because of the cell potential, lack of oxidation-corrosion problems, and elimination of overpotential problems of conventional cells allow many different cell arrangements to be used in the performance of the invention. One arrangement can comprise a standard cell arrangement with the entire cell subject to radiation from a light source. Other arrangements can comprise cells with one metal electrode and one semiconductor electrode where the semiconductor can be irradiated either from the solution side or dry side of the cell.

As stated above, the key component in the electrolytic solution is the bromide compound present in the solution in amounts up to about 50% by weight, with a concentration of about 48% by weight preferred. This provides the hydrogen (and bromine if desired) to run the ultimate fuel cell which the photoelectrolytic cell is intended to produce. While water is the preferred solvent for the electrolyte and hydrogen bromide the preferred electrolyte the system is readily adaptable to other solvents and bromide containing electrolytes. For example, alcohols or amines may be used as solvents for the system and such bromide electrolytes as KBr, NaBr, LiBr, CsBr and $SrBr_2$ may be used either individually, as mixtures or admixtures with the HBr. If alcohol or amine solvents are employed it is preferred to add at least small amounts of water to the system especially if a bromide other than HBr is used as the bromide electrolyte. The concentration of the hydrogen bromide may be any concentration up to the saturation point of the solution, provided the cell potential does not reach the corrosion potential for the semiconductor being used. The system may also be run at any operable pressure with up to 1 atmosphere being preferred.

As mentioned above, the source of energy to run the cell can be any radiant energy source with wavelengths shorter than the band gap radiation characteristic of the semiconductor used. For example, for the boron phosphide semiconductor of the present invention any light source with wavelengths less than 6,200 angstroms could run the system.

Reference is now made to the various figures for details of the cell configuration. In FIG. 1 a conventional electrolytic cell housing 1 comprising an n-type BP semiconducting anode 2 and a p-type BP semiconducting cathode 3 are connected through external circuit 4. The electrolyte solution 5 is a 48% solution of hydrogen bromide and water separated by a hydrogen ion permeable membrane 6 such as Nafion ® (E. I. Dupond de Nemours and Co.), thin quartz, polyvinyl chloride, or polytetrafluoroethylene, which allow free hydrogen ion transport in the system. Upon activation with light or other radiant energy 7 current is conducted through the external circuit 4 upon dissociation of the hydrogen bromide resulting in the production of hydrogen gas 8 in the p-electrode chamber and liquid bromine 9 in the n-electrode chamber.

In FIG. 2, a dry side irradiation cell arrangement is depicted wherein the cell housing 10 contains a metal electrode 11, such as platinum or titanium, connected by external circuit 12 to the semiconductor electrode 13 containing a tin oxide outer layer 14. When light or other radiant energy 15 impinges on semiconductor 13, the hydrogen bromide electrolyte solution 16 dissociates, causing the migration of the hydrogen ions to the platinum or titanium electrode 11 and bromide ions to semiconductor electrode 13 resulting in the evolution of hydrogen gas 17 at electrode 11 and liquid bromine 18 at electrode 13.

FIG. 3 demonstrates another solution side radiation apparatus. Housing 19 encloses the hydrogen bromide and water electrolyte solution 20 which is subjected to light or other radiation 21. When the radiation impinges semiconductor surface 22, charge transfer across the electrolyte-semiconductor interface takes place, discharging one of the ions in the solution and hydrogen gas 23 is evolved at the platinum electrode 24 and liquid bromine 25 at electrode 22. The transfer of charge across the electrolyte-semiconductor interface results in an imbalance of charge in the semiconductor and a driving voltage for current flow through an external circuit 26 to electrode 24 immersed in the electrolyte. As summarized in FIG. 4 in the generation of electrical power from the chemical reaction of $H_2$ and $Br_2$, the fuel cell generates HBr which is recycled through the system. During periods of high solar radiation the solar generated $H_2$ and $Br_2$ can be stored for utilization in the generation of electrical power during periods of little or no solar radiation.

EXAMPLE I

A 48% weight solution of a hydrogen bromide in water was placed in an electrolyte cell comprised of an n-type boron phosphide anode and a platinum cathode. The n-type boron phosphide semiconductor was comprised of a composite of a boron phosphide layer on gallium arsenide, with aluminum ohmic contacts. An external power source of 0.1 amp per centimeter squared was impressed across the electrodes. The system was run at 50° C. and subjected to a simulated solar distribution of solar light of an intensity of about three times that of a normal sun (produced by a mercury xenon lamp operated at about 900 watts input power). The system was run for over a hundred hours, producing bromine liquid at the n-type electrode and hydrogen gas at the platinum electrode. No corrosion of the semiconductors was detected.

Although this invention has been shown and described with respect to a preferred embodiment thereof, it should be understood by those skilled in the art that various changes and omissions in the form and detail thereof may be made therein without departing from the spirit and scope of the invention.

Having thus described a typical embodiment of my invention, that which I claim as new and desire to secure by Letters Patent of the United States is:

1. A process for producing hydrogen gas from an electrolyte solution in an electrolyte cell, wherein the improvement comprises utilizing a solution of a bromide compound as the electrolyte in conjunction with radiant energy, and an n-type semiconducting boron phosphide electrode to at least partially power the electrolytic cell.

2. The process of producing hydrogen gas in an electrolytic cell comprising:
   providing an electrolytic cell enclosure containing a bromide electrolyte solution;
   immerising an n-type semiconducting boron phosphide anode and a p-type semiconducting boron phosphide cathode into the bromide electrolyte solution;
   separating said electrodes by a hydrogen ion permeable membrane also immersed in said bromide electrolyte solution;
   exposing the semiconducting electrodes to radiant energy of proper wavelength and sufficient intensity to cause the evolution of hydrogen gas at the cathode and bromine liquid at the anode.

3. A process of producing hydrogen gas in an electrolytic cell comprising:
   providing an electrolytic cell enclosure containing a hydrogen bromide electrolyte solution;
   placing a platinum electrode and an n-type semiconducting boron phosphide electrode into the hydrogen bromide electrolyte solution, wherein the semiconducting electrode also forms part of the wall of the electrolytic cell enclosure containing the platinum electrode and hydrogen bromide solution;
   irradiating the semiconducting electrode from that side of the semiconducting electrode which represents the wall portion of the cell containing the hydrogen bromide solution with radiant energy of proper wavelength and sufficient intensity to evolve hydrogen gas at the platinum electrode and liquid bromine at the semiconducting electrode.

4. The process of producing hydrogen gas in an electrolytic cell comprising providing an electrolytic cell enclosure containing a bromide electrolyte solution;
   placing a platinum electrode and an n-type semiconducting boron phosphide electrode in a bromide electrolyte solution;
   subjecting the semiconducting electrode to a radiant energy source of proper wavelength and sufficient intensity to evolve hydrogen gas at the platinum electrode in the space between the two electrodes and liquid bromine into the solution between the area defined by the electrodes.

5. The process of claims 1, 2, 3 or 4 wherein the bromide electrolyte is selected from the group consisting of HBr, NaBr, KBr, LiBr, CsBr, $SrBr_2$ and mixtures thereof.

6. The process of claim 5 wherein the bromide compound is present in an amount of up to about 50% by weight and the solvent is water.

7. The process of claims 1, 2, 3 or 4 wherein the radiant energy is solar energy.

8. The process of claims 1, 2, 3 or 4 wherein the radiant energy is laser radiation.

9. The process of claims 1, 2, 3 or 4 wherein the radiant energy is produced by a light emitting solid state diode.

10. The process of claims 1, 2, 3 or 4 wherein the radiant energy is light of wavelength up to 6,200 angstrom.

11. The process of claims 1, 2, 3 or 4 wherein the electrolyte is a 48% by weight solution of HBr in water.

12. The process of claims 1, 2, 3 or 4 wherein at least part of the energy necessary to power the cell is provided by an external power source comprising a battery.

13. The process of claims 1, 2, 3 or 4 wherein the semiconducting boron phosphide electrode comprises a composite of boron phosphide next to a semiconducting layer of gallium arsenide or silicon in contact with an aluminum or gold ohmic contact.

* * * * *